United States Patent [19]
Tanaka et al.

[11] Patent Number: 4,989,162
[45] Date of Patent: Jan. 29, 1991

[54] METHOD OF USING AN ACCURACY VALVE IN A CONFLICT RESOLUTION OF A FORWARD INFERENCE

[75] Inventors: Toshiyuki Tanaka; Nobuo Nakamura, both of Yamatokoriyama; Mutsuhiro Yamamoto, Nara, all of Japan

[73] Assignee: Sharp Kabushiki Kaisha, Osaka, Japan

[21] Appl. No.: 278,441

[22] Filed: Dec. 1, 1988

[30] Foreign Application Priority Data

Dec. 3, 1987 [JP] Japan ................................. 62-307999

[51] Int. Cl.$^5$ .............................................. G06F 15/18
[52] U.S. Cl. ..................................................... 364/513
[58] Field of Search ... 364/200 MS File, 300 MS File, 364/900 MS File, 513

[56] References Cited

U.S. PATENT DOCUMENTS

| | | | |
|---|---|---|---|
| 4,730,259 | 3/1988 | Gallant ................................. | 364/513 |
| 4,763,277 | 8/1988 | Ashford et al. ...................... | 364/513 |
| 4,803,641 | 2/1989 | Hardy et al. ......................... | 364/513 |
| 4,809,219 | 2/1989 | Ashford et al. ...................... | 364/900 |

OTHER PUBLICATIONS

OPS5 User's Manual, Charles L. Forgy, Jul. 1981, pp. 37–40 (Carnegie-Mellon University, Department of Computer Science).

The Handbook of Artificial Intelligence, vol. 2, Avron Barr and Edward A. Feigenbaum, 1982, pp. 184–193.

*Primary Examiner*—Gary V. Harkcom
*Assistant Examiner*—John A. Merecki

[57] ABSTRACT

An interrogating device includes a memory for storing forward rules and facts, which are used in a forward inference control system, and a control unit operable to add or delete a fact to the memory. In this interrogating device, the accuracy indicates the probability degree of preparation for a conclusion section of the rule. The fact is added to the conclusion section of the rule and is stored in the memory. Also, the accuracy may be used in a strategy for a conflict resolution of a forward inference control. The fact for the accuracy that is obtained in the backward inference has a structure identical to the fact which the accuracy is added for use in the forward inference. By adding the accuracy negatively to the fact and the rule, an inference which uses uncertain data in the forward inference is possible.

2 Claims, 4 Drawing Sheets

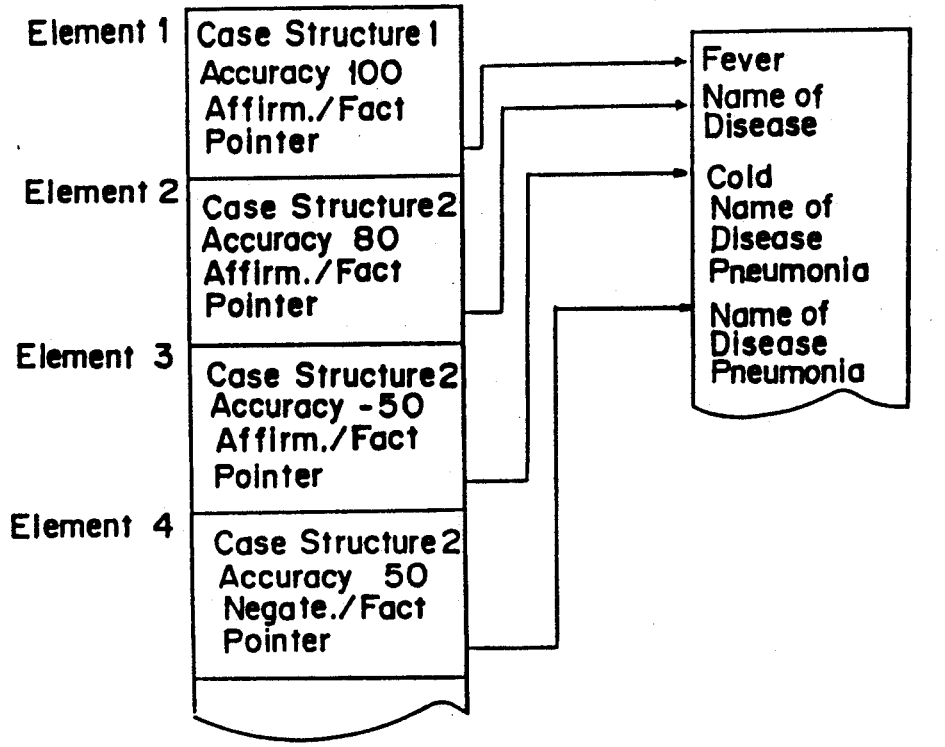
Fig. 2 Structure of facts stored in Memory 5
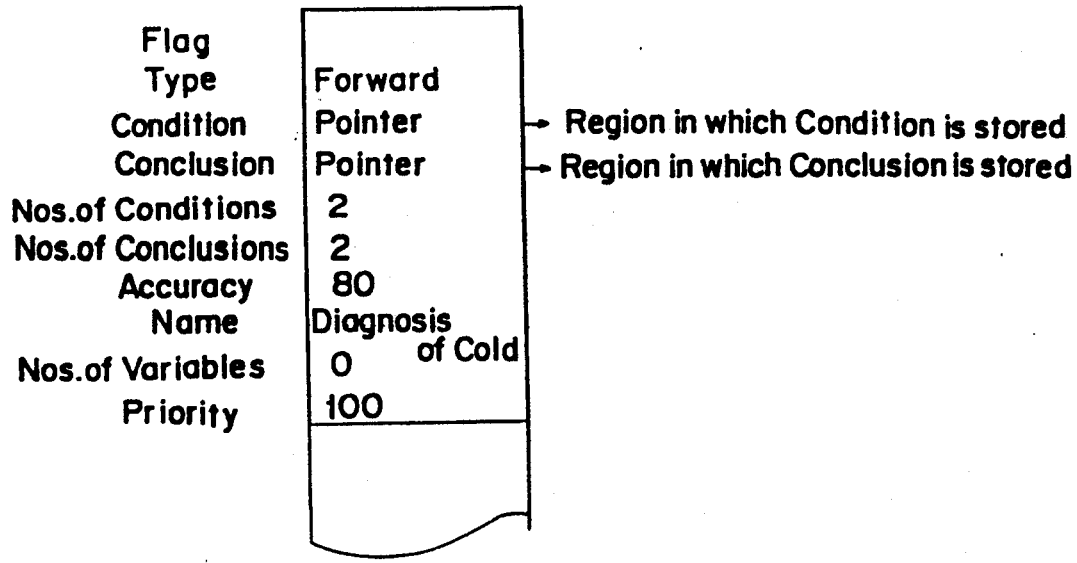
Fig. 3 Structure of Rule Conclusion Section

| Name of Action | Parameter |
|---|---|
| "DISPLAY" | Character Sequence Pointer | → The name of the disease appears to be a cold.
| "MAKE" | Pattern | → The name of the disease is cold.
| "ACTION END" | |

METHOD OF USING AN ACCURACY VALVE IN A CONFLICT RESOLUTION OF A FORWARD INFERENCE

BACKGROUND OF THE INVENTION

1. Field of the Invention

The present invention relates to an interrogating device capable of performing a forward inference with the use of uncertain data.

2. Description of the Prior Art

Hitherto, in resolving a problem with the use of an interrogating device capable of performing inference according to a forward inference control system, the facts and the rules are treated as being decided. Accordingly, where the inference is desired to be carried out with the use of uncertain data, a value indicative of the inference accuracy must be described as a positive value in a pattern of a conclusion section for the fact and the rule.

Also, a conflict resolution in the prior art forward inference control system is designed as to be carried out on the basis of a fact prepared by the execution of the rule.

As hereinabove discussed, in the prior art interrogating device based on the forward inference control system, the device can handle merely the decided fact and rule. When the uncertain fact and rule are to be handled, the value indicative of the accuracy must be positively described in a pattern of facts and a pattern of the conclusion section of the rules. Therefore, it is difficult to handle uncertain knowledge (facts and rules). In addition, according to the conflict resolution according to the prior art forward inference control system, priority is given to a new fact prepared by the execution of the rules. Therefore it is not possible to quickly give a conclusion of a high probability with knowledge used preferentially.

On the other hand, in the interrogating device having a backward inference control system, it is possible to perform an uncertain inference with the use of the degree of accuracy. However, since it is not possible to perform the uncertain inference with the forward inference control system, it is not possible to introduce the forward inference control system in the interrogating device having the backward inference control system.

SUMMARY OF THE INVENTION

An important object of the present invention is to provide an interrogating device of a type which can quickly give a conclusion of a high probability by adding an accuracy to the fact and rule for permitting the forward inference control system to perform the uncertain inference. Thereby, the accuracy can be employed in the conflict resolution by using knowledge preferentially, and being capable of easily performing a fused inference with the backward inference using the probability.

In order to accomplish the above described object, the present invention provides an interrogating device, which comprises a memory for storing rules and facts that may be used in a forward inference control system, and a control section capable for performing a forward inference control of adding or deleting a fact relative to the memory. Wherein the accuracy indicating the probability degree for preparing a conclusion section and the fact stored in the memory is added to the conclusion section for the rule and the fact stored in the memory so that the accuracy can be used in a strategy conflict resolution of the forward inference control.

According to the present invention, the interrogating device is supplied with the rules and facts for use in the forward inference control system and are subsequently stored in the memory. At this time, if the preparation for a conclusion section of the above described rules is uncertain, the accuracy which indicates the probability degree for of the preparation is added to the conclusion section of the rules and is then stored in the above described memory. However, if the preparation of the facts is uncertain, the accuracy which indicates the probability for the preparation is added to the facts and is then stored in the above described memory. Accordingly, it is possible to carry out the inference using uncertain data in the forward inference. Also, if the interrogating device according to the present invention is used, a high conclusion can be quickly obtained with the use of the accuracy in the strategy of the conflict resolution for the forward inference control.

BRIEF DESCRIPTION OF THE DRAWINGS

This object and other objects and features of the present invention will become clear from the following description taken in conjunction with a preferred embodiment thereof with reference to the accompanying drawings, in which:

FIG. 2 is a diagram showing the structure of facts stored in a working memory;

FIG. 3 is a diagram showing the structure of rules stored in a rule storage unit;

DETAILED DESCRIPTION OF THE EMBODIMENTS

Figure 1:
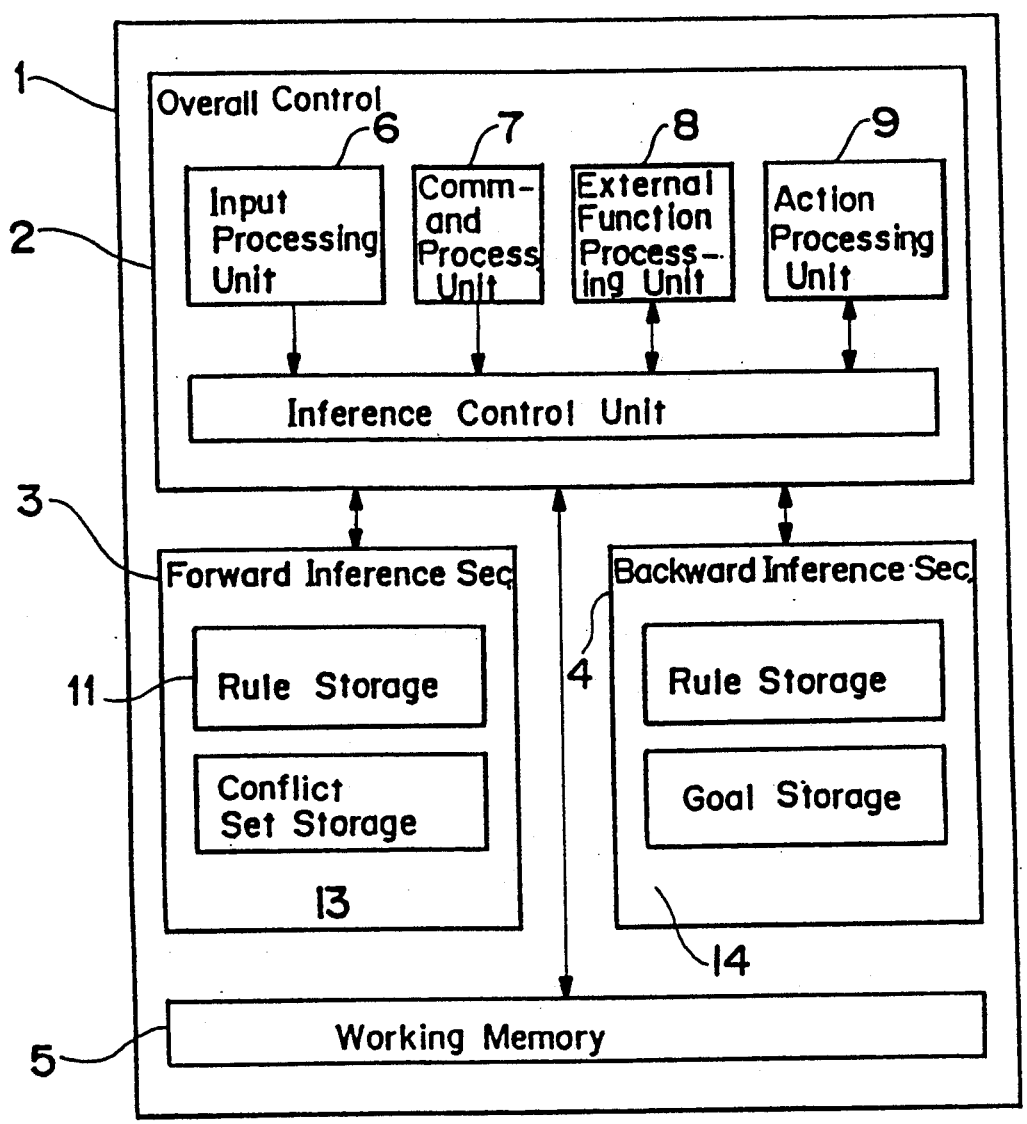
FIG. 1 is a block diagram showing the structure of an interrogating device according to one embodiment of the present invention.

FIG. 1 illustrates a block diagram showing the structure of an interrogating device 1 having both a forward inference control mechanism and a backward inference control mechanism. The interrogating device 1 comprises an overall control unit 2, a forward inference section 3, a backward inference section 4 and a working memory 5.

The overall control unit 2 starts or terminates an interrogating operation (as will be described later), executes a forward/backward inference control, analyzes input data, processes a command relative to the interrogating device 1, and processes actions obtained from the inference during the execution.

In other words, an input processing unit 6 reads and analyzes files containing facts and rules that are separately complied by a program synthesizing device (not shown) so that the contents of the files can be classified into facts, forward inference rules, backward inference rules and commands relative to the interrogating device 1. Where a result of the classification is facts, the facts are stored in a working memory 5; where a result of the classification is the forward inference rules, the forward inference rules are stored in a rule storage 11 of the forward inference section 3; where a result of the classification is the backward inference rules, the backward inference rules are stored in a rule storage 12 of the backward inference section 4; and where a result of the classification is a command, the command processing unit 7 is called. By so doing, the command processing unit 7 executes, depending on the contents of the command, a process which starts the inference and processes a command issued to the interrogating device 1 from the outside such as the display of the contents of the working memory 5 and the specification of a strategy. By way of example, when a command instructing the start of the inference is inputted, an inference control unit 10 is called for the execution of the inference. An external function processing unit 8 performs a process which is to be executed when an external function is called during the execution of the inference. An action processing unit 9 is operable for performing an action which takes place during the forward inference or the backward inference as will be described later.

The forward inference section 3 performs a comparison between the fact stored in the working memory 5 and a condition of the rules stored in the rule storage 11 to synthesize a conflict, set consisting of the rule and the corresponding fact and the have satisfied the condition, which conflict set is subsequently stored in a conflict set storage 13. Then, by a conflict resolution, one of the rules is selected from the conflict set and the action of a conclusion portion of the selected rule is executed.

The backward inference section 4 sets up a goal according to the rules stored in the rule storage 12 for the backward inference and refers to the working memory 5 for determining whether or not the goal has been established.

Where interrogation is performed with the use of the interrogating device 1 in the above described construction, the following procedures are taken.

(1) A file consisting of the fact and the rule is prepared by a program synthesizing device (not shown).

(2) The contents of this file are analyzed by the interrogating device 1 and are stored in a storage device (the rule storages 11 and 12 and the working memory 5 shown in FIG. 1).

(3) With the use of the fact and the rules stored in the storage devices 11, 12 and 5, the inference is executed as will be described later. If it does not function properly, the procedure (1) above is resumed.

The present invention relates to the sentence construction that is used to synthesize a knowledge file during the procedure (1), conversion that is made for the storage in the rule storages 11 and 12 and also in the working memory 5 during the procedure (2) and to how the inference that is executed during the procedure (3).

(A) Sentence Construction of Knowledge

There is a fact and a rule for the above described knowledge. Hereinafter, the sentence construction for each fact and rule will be discussed. The accuracy in the illustrated embodiment is expressed by an integer value within the range of −100 to 100.

An example of the sentence construction of the fact in the of knowledge file is illustrated in Table 1 below.

TABLE 1

| There is a fever | |  ; |
|---|---|---|
| The name of a disease is cold | 80 | ; |

TABLE 1-continued

| The name of a disease is pneumonia | −50 | ; |
|---|---|---|
| ! the name of a disease is pneumonia | 50 | ; |

In the examples of the four facts shown in Table 1, the first fact is "There is a fever" which represents a pattern of fact (as will be described later) with the symbol ";" showing the end of the fact. If no numerals exist in front of ";", the accuracy of the fact is 100 and such a fact is treated as a decisive fact. The second fact indicates that the accuracy of the fact, "The illness is a cold", is 80. The third fact indicates that accuracy of the fact, "The illness is pneumonia", is −50. If the accuracy is shown by a negative numeral, it means that the fact is denied. The fourth fact is a negative form of the third fact. The symbol "!" placed at the head of the sentence indicates a negation. The third and fourth facts are totally and equally treated.

A type of existence relative to the fact is void. The existence/void is attached to each condition within the condition section of the rules, as will be described, and is used for the determination of whether or not such conditions are established.

An example of the sentence construction, for the rule in the knowledge file is shown in Table 2.

TABLE 2

<Diagnosis of Cold>
If
there is a fever
there is a quivering
then,
(display "The illness appears a cold")  100
(make The illness is a cold)  80  ;

The rule consists of the rule designation "<Diagnosis of Cold>", the priority "100", the condition section "If ... ", the conclusion section "then", and the accuracy "80" with the end of one rule being represented by the symbol ";". The priority of this rule is 100. The priority in the illustrated embodiment can take any value within the range from −32768 to 32767 and the priority will be zero (0) if the description is omitted. Accordingly, the rule shown above in Table 2 gives a priority to the other rules in which the priority has been omitted. The accuracy may be omitted and, if omitted, the accuracy will be regarded to be 100 as described above. In the example shown in Table 2, the accuracy is 80. The accuracy of the rule is 80 means that "the accuracy of the newly added fact for the case when one of the accuracies of the facts matches with each condition in the condition section and is stored in the working memory 5, is 80". If the lowest accuracy is not 100, a proportional distribution is made to render the accuracy 80 of the rule to be 100. In this way, by adding a negative accuracy to the conclusion section of the rule and the fact, the forward inference of uncertain data is possible.

(B) Storing Method

The fact and rule of the above described sentence construction are stored in the working memory 5 and the rule storages 11 or 12, respectively, by the input processing performed in the input processing unit 6 shown in FIG. 1.

A method of storing the fact in the working memory 5 will first be described. By way of example, the four facts shown in Table 1 may be stored in the structure form as shown in FIG. 2. In the interrogating device 1 of the illustrated embodiment, in order to maximize the efficiency of the memory, there is provided a region in which a case structure of the fact is separately stored. In an entry for the case structure of the working memory 5, an arrangement of numbers for case structures are allocated corresponding to the regions in which the actual case structures are stored. Moreover, accuracies, flags and pointers are allocated to the working memory 5. Furthermore, the accuracy, flag and pointer are allocated to the working memory 5. A method of dividing the above described region does not affect the present invention. That is to say, in the present invention, it is important to provide each element in the working memory 5 with a region for the storage of the accuracy.

Referring to FIG. 2, the case structure 1 in the first entry represents a structure of the fact "There is ", while the case structure 2 represents a structure of the fact "It is ". In the actual working memory 5, the arrangement of numbers for the corresponding case structures, as described above, are stored. The flag in the third entry is a flag used to express whether each element in the working memory 5 is affirmative or whether each element in the working memory 5 is negative. The arrangement (or address) of the number for the case structure is entered in the pointer as the last entry.

Hereinafter, a method of storing the rule in the rule storages 11 or 12 will be described. By way of example, the rules shown in Table 2 are, stored in the rule storages 11 and 12 in the structure forms as shown in FIG. 3. In the illustrated embodiment, as is the case with the fact, in order to maximize the efficiency of the memory, the condition section and the conclusion section of the rules are stored in respective regions. The condition section and the conclusion section store respective pointers indicative of the position of the condition section and the conclusion section corresponding to the above described regions. Only a structure which constitutes the heart of the rule is illustrated here.

Although the rule storages 11 and 12 for the forward and backward inferences, respectively, are shown separately, in FIG. 1, a common region is occupied by the forward and backward inference rules. Depending on the type shown in the second entry in FIG. 3, the forward inference rule and the backward inference rule are separated.

Figures 4, 5:
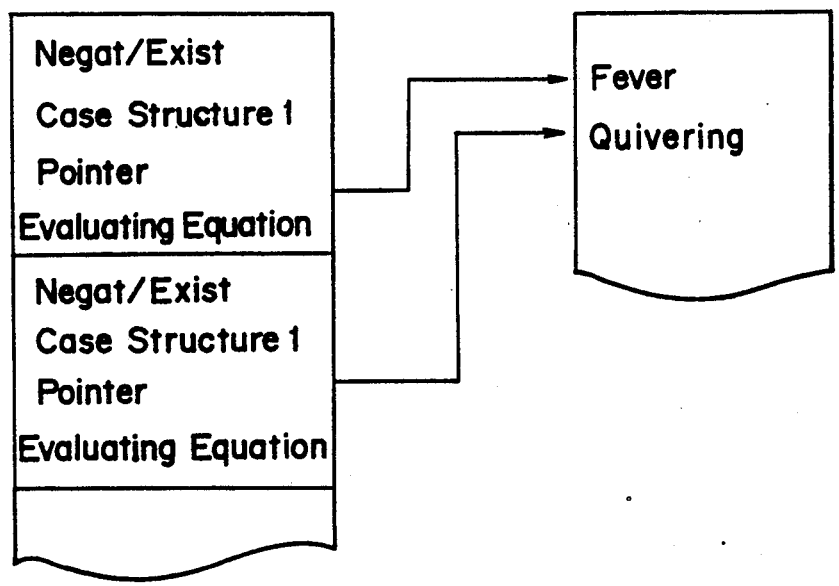
FIG. 4 is a diagram showing a storage structure for a condition unit of the rules.
FIG. 5 is a diagram showing a storage structure for a conclusion unit of the rules.

A method of storing conditions of the rule will now be discussed. The storage structure of the conditions is shown in FIG. 4. This is a structure in a region pointed out by of the condition in the structure of the rule shown in FIG. 3. The structure of the conditions is, as is the case with the structure of the facts, stored with case structures separated in respective regions. The first entry of the structure, for the conditions represents the type of condition. The type of condition is weighed by a bit-to-bit manner in the memory. "Negation" ("Negat." in FIG. 4) is the same as the negation of the fact as described above. "Existence" ("Exist." in FIG. 4) indicates the establishment of a condition when the fact which matches with such a condition exists in the working memory 5. The respective entries for the case structure and the pointer are the same as described above in connection with the entries for the fact. The entry of the evaluating equation is used in the case where the condition makes use of a variable and there is some limitation to the variable. The content actually stored in the entry of the evaluating equation is a pointer towards a structure of the equation.

Also, a method of storing the conclusion section of the rule will now be described. The rule structure of FIG. 3 shows a structure of a region that is directed by a pointer of the conclusion section. As shown in FIG. 5, the action in the conclusion section consists of the name of the action and a parameter. The action in the example shown in Table 2 is "DISPLAY" and "MAKE" of the fact. In the case of displaying, since processing is done with the display of the parameters and the display of the character sequence separated, a value of "DISPLAY" is entered in the case of displaying the character sequence. In the case of adding the fact, a value of "MAKE" is entered. Finally, "ACTION END" is entered.

"DISPLAY", "MAKE", and "ACTION END" are in fact integer values and, in the illustrated embodiment, they are expressed by the respective character sequences. In practice, however, 1, 2 and 0 are respectively allocated to "DISPLAY", "MAKE" and "ACTION END".

(C) Execution of Forward Inference

The forward inference is executed in the following procedures.
(1) A comparison is made between each condition in the condition section of the rules and the fact in the working memory 5 so that a rule can be selected in which all of the conditions are satisfied. At this time, if there is a plurality of fact sets in the working memory 5 with respect to a certain rule which satisfies the condition section, they are distinguished. The rule which has been selected as a result of establishing the conditions is hereinafter referred as an executable rule. A set of the executable rule and the fact corresponding thereto is called a conflict set.
(2) Only one is selected from the conflict set as determined during the procedure (1) above. The selection of only one from the conflict set is called a conflict resolution, and the manner of selecting is called a strategy of the conflict resolution, or simply a strategy. Where there is no conflict set, the inference is terminated.
(3) The conclusion section of the rule which has been selected as a result of the conflict resolution is executed. This is referred to as a firing of the rule, or simply a firing. After the firing, the procedure (1) above resumes.

Each time the rule is executed, a comparison is made between the next succeeding rule and the working memory 5. However, a combination of the rule, which has previously been fired, and the fact in the working memory 5 will no longer be added to the conflict set.

(C-1) Matching

With respect to each condition of the rule and the fact in the working memory 5, comparisons of the pattern, the accuracy and the affirmative/negative are carried out in the following manner.
(i) The pattern is checked as to whether it matches. The pattern refers to a of a case construction, such as "There is . . . ", and a value "fever" in the sentence "There is a fever". A variable may be used as a condition and, in such a case, a check is made with the use of a value, confined by the variable, to determine if the pattern matches with each other.

(ii) By combining the accuracy and the affirmative/negative, the matching is determined according to Table 3 below.

TABLE 3

| Matching | Condition | Elements in the Working Memory | |
|---|---|---|---|
| Success | Affirmative | Affirmative | 20 < = Accuracy |
| Failure | Affirmative | Affirmative | Accuracy < 20 |
| Success | Affirmative | Negative | Accuracy < = −20 |
| Failure | Affirmative | Negative | −20 < Accuracy |
| Success | Negative | Affirmative | Accuracy < = −20 |
| Failure | Negative | Affirmative | −20 < Accuracy |
| Success | Negative | Negative | 20 < = Accuracy |
| Failure | Negative | Negative | Accuracy < 20 |

Figure 6:
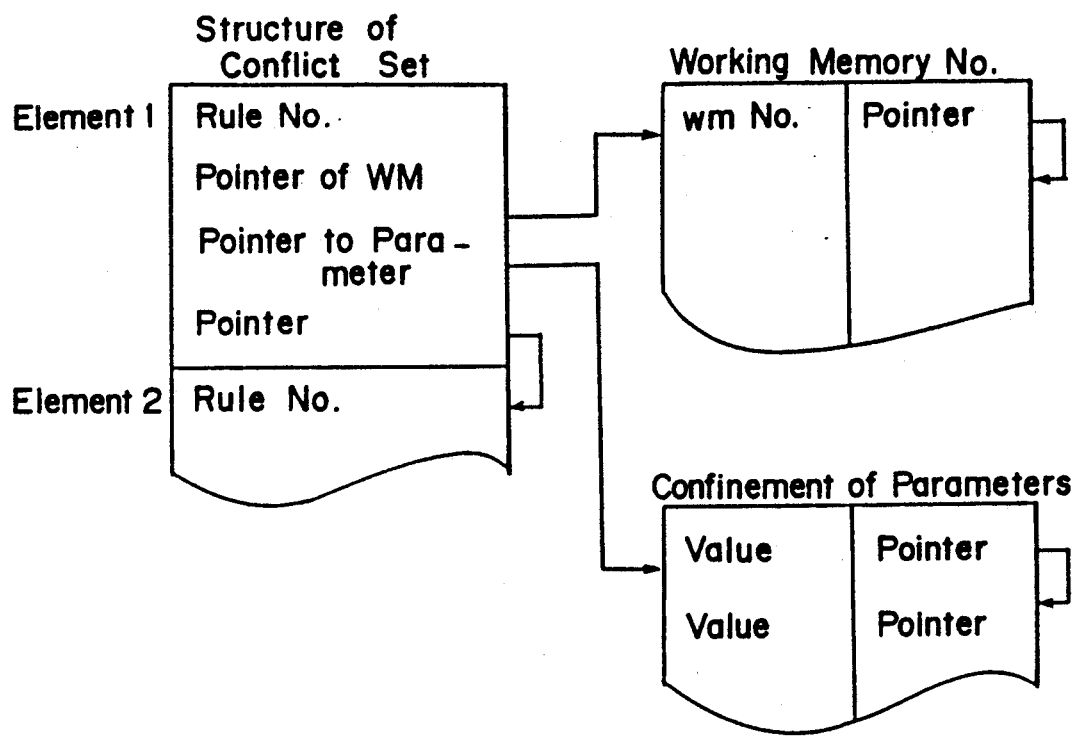
FIG. 6 is a diagram showing a storage structure for elements of a conflict set.

In this way, when all of the conditions in the rule are established, sets of the established rules and the facts in the working memory 5 are registered in the conflict set storage 13 in the forward inference section 3 shown in FIG. 3. The structure of storage for the conflict sets are shown in FIG. 6. The structure of elements for the conflict set consists of the rule number, the number of the elements in the working memory 5 which have matched, the confinement of the variable during the matching and the pointer which arranges according to the strategy. This storage structure for each rule which has been matched and the fact is prepared in the working memory 5. The accuracy can be referred to by the rule number and the wm number.

(C-2) Conflict Resolution

Figure 7:
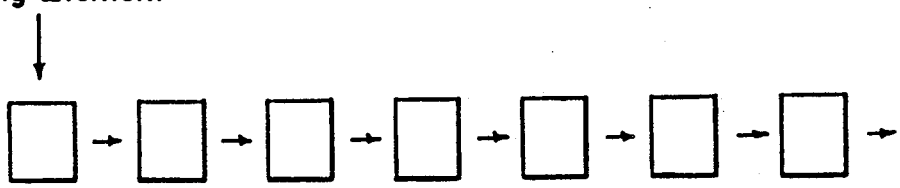
FIG. 7 is a diagram showing the elements of the conflict set linked together in a chain.

The elements of the conflict set prepared in (C-1) are arranged according to the strategy at that time. In the illustrated embodiment, the arrangement is not carried out after all of the elements have been determined, but each time the element is determined, the elements so determined are successively inserted in a list of the elements. The elements are chained together as shown in FIG. 7 by respective pointers shown in FIG. 6.

Where a new element is made, the new element is inserted in the chain of the elements by the following procedures.

(A) The heading element of the conflict set is rendered to be subject to a comparison.

(B) A comparison is made between the new element and the heading element according to the current strategy.

(C) If priority is given to the new element as a result thereof, the new element is inserted in front of the element which is rendered to be subject to a comparison, and is followed by the termination.

(D) If priority is not given to the new element, the new element is again compared with the next succeeding element. If there is no element with which it is to be compared, the new element is inserted subsequent to the last element, followed and is by the termination.

(E) Return to (B).

In the strategy used for the comparison during the procedure (B), hitherto there are strategies called "LEX" and "MEA". These strategies are capable of carrying out the conflict resolution with regard to of the fact in the working memory 5 which has matched with the condition of the rule. However, in the case of the inference carried out with the use of the accuracy, it is not easy to perform the efficient inference with the strategies "LEX" and "MAE". In other words, where the inference is carried out with the use of the accuracy, it is efficient to start with the rule of a high accuracy. However, the facts of a high accuracy stored in the working memory 5 are not always limited to new facts. Therefore, in the illustrated embodiment of the present invention, the accuracy of the rule and fact are rendered to be negative so that the accuracy can be used in the strategy of the conflict resolution and the efficient inference with the use of uncertain data may be accomplished.

The strategy using the accuracy will now be described, and it is noted that this corresponds to the procedure (B) associated with the insertion of the element.

(a) With respect to the newly created element (fact) through the matching and the element subjected to the comparison in the conflict set, the following "accuracy of elements" is carried out.

(a-1) The "accuracy of the rule" for both of the elements by means of the rule numbers for the elements are obtained.

(a-2) All of the accuracies of the facts in the working memory 5 which have matched with the rules of both of the elements by means of the wm numbers are referred to. Then, the accuracy for each element represented by the smallest of the absolute values is selected as the "accuracy of the working memory".

(a-3) From the "accuracy of the rule" obtained in (a-1) and the "accuracy of the working memory" selected in (a-2), the "accuracy of the elements" is calculated with respect to each of the elements by multiplying the accuracy of the rules by the accuracy of the working memory.

(b) When the "accuracies of the elements" is obtained in (a-3), the element of the higher value is inserted in the conflict set prior to the element of the smaller value.

(c) If the "accuracies of the elements" so determined are of equal value, the "LEX" strategy is used to determine which one of the elements is to be given priority.

(C-3) Execution of Rule

At the termination of the conflict resolution in (C-2), the heading element of the conflict set is drawn out, and the action of the conclusion section of the rule is carried out according to the rule number of the element that is drawn out. At this time, where the action to be executed is "make" or "modify", the "accuracy of the element" determined in (C-2) is added to the above described action (as the accuracy to be added to the fact to be changed or added to the working memory 5).

(D) Fusion with Backward Inference

The case in which the backward inference and the forward inference are concurrently used will now be described.

According to the backward inference, a tree structure of given rules is searched and, if necessary (such as when branches to be examined are no longer available), interrogation is carried out so that the fact obtained as a result of the interrogation and the fact obtained as a result of the conclusion of the individual rules can be added as elements of the working memory 5. The search is conducted until the final goal is satisfied. At this time, the facts given for the accuracy in the result of the interrogation and the conclusion of the rules are written in the working memory 5.

In this way, the fact for the accuracy that is obtained with the backward inference has a structure identical with the fact (to which the accuracy is added) for use in the forward inference in which an uncertain inference is rendered possible according to the illustrated embodiment of the present invention. Because of this, the fact obtained with the backward inference system can be rendered possible for use with the forward inference system. Also, since the inference is carried in the order from those having a higher accuracy, it is possible to perform an the efficient inference.

Thus, according to the present invention, by adding the accuracy negatively to an fact and the rule, the inference which uses uncertain data is possible in the forward inference. Accordingly, it is possible to preferentially use the knowledge of a high accuracy with the use of the accuracy in the strategy of the conflict resolution of the forward inference for quickly giving a conclusion of a high accuracy. Also, a fused inference having the forward inference and the backward inference using an accuracy that is fused together can be easily carried out.

It is to be noted that, although the foregoing illustrated embodiment relates to the interrogating device of the type wherein a forward inference control mechanism and a backward inference control mechanism are concurrently used, the present invention is not always limited thereto, but may be applicable to the interrogating device using the forward inference control mechanism.

From the foregoing description, it is clear that the present invention provides an interrogating device which comprises a memory for storing rules and facts, and a control section capable of performing a forward inference control for adding or deleting a fact relative to the memory, wherein the accuracy indicative of the probability degree of preparation for a conclusion section and the fact stored in the memory are is added to the conclusion section of the rule and the fact stored in the memory. Thereby, inference is possible with the use of uncertain data.

Accordingly, if the present invention is used, it is possible to use the accuracy in the strategy of the conflict resolution of the forward inference and to quickly give a conclusion of a high accuracy by the preferential use of the knowledge of a high accuracy. Also, it is possible to perform the fused inference between the forward inference and the backward inference using the accuracy.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims.

What is claimed is:

1. An interrogating device comprising:
    input processing means for reading data and classfying the data into facts, forward inference rules having a condition section corresponding to each of said forward inference rules, backward inference rules, and commands;
    a working memory for storing said facts;
    backward inference control means for setting a goal in response to said backward inference rules and comparing said goal with said facts from said working memory to determine whether said goal has been established and storing said goal in said working memory as one of said facts when said goal has been determined to be established,
    forward inference control means for comparing each of said facts from said working memory with each element of said condition section and synthesizing a conflict set, said conflict set including a plurality of executable rules and facts defined by the elements of said condition section which match said facts stored in said working memory;
    inference control means for enabling said forward inference control means, enabling said backward inference control means or storing said facts in said working memory in response to said commands;
    means for calculating accuracy values for each of said executable rules and said facts of said conflict set according to a predetermined equation; and
    accuracy establishments means for adding said accuracy values to each of said executable rules and said facts of said conflict set, said accuracy values being used to evaluate the comparison between each element of said condition section and said facts by said forward inference control means for synthesizing one of said executable rules of said conflict set according to a strategy which provides a conflict resolution of said conflict set by selecting said one executable rules of said conflict set.

2. A method for performing a forward inference analysis in an interrogating device comprising the steps of:
    (a) reading data into the interrogating device; (b) classifying the data into facts, forward inference rules having a condition section corresponding to each of said forward inference rules, backward inference rules, and commands;
    (c) storing said facts in a working memory;
    (d) storing said forward inference rules and said backward inference rules in a rule memory;
    (e) comparing each of said facts from said working memory with each elements of said condition section from said rule memory;
    (f) synthesizing a conflict set, said conflict set including a plurality of executable rules defined by the elements of said condition section which match said facts in said step (e);
    (g) setting a goal in response to said backward inference rules from said rule memory;
    (h) comparing said goal with said executable rules from said memory to determine whether said goal has been established;
    (i) storing said goal in said working memory as one of said facts when said goal is determined to match one of said executable rules in said step (h);
    (j) developing accuracy values for said facts and said executable rules of said conflict set according to a predetermined equation; and
    (k) adding said accuracy values to each of said executable rules and said facts of said conflict set, said accuracy values being used to evaluate the comparison of said step (e) and the synthesis of said step (f) for one of said executable rules of said conflict set according to a strategy which provides a conflict resolution of said conflict set by selecting said one executable rules of said conflict set.

* * * * *